Patented June 23, 1942

2,287,351

UNITED STATES PATENT OFFICE 2,287,351

RESINOUS PRODUCT AND METHOD OF MANUFACTURE THEREOF

Robert W. Martin, Wilmington, Del., assignor to Hercules Powder Company, Wilmington, Del., a corporation of Delaware No Drawing. Application March 30, 1939, Serial No. 264,970

8 Claims. (Cl. 260—110)

This invention relates to a method of producing a resin and more particularly to a method of directly producing from resinous wood a pulverulent, free-flowing resin characterized by substantial insolubility in light petroleum hydrocarbons and to the product so made.

It has been the practice heretofore to treat resinous wood such as, for example, pine chips in order to extract therefrom rosin and various volatile terpenes such as turpentine and pine oil. Gasoline, for example, has been widely used in the extraction of rosin from pine wood, and the total resinous matter so extracted is commonly known in the art as FF rosin. However, a solvent which comprises a coal tar hydrocarbon such as, for example, benzene, toluene, xylene, etc., has the property of extracting from pine wood, e. g., wood of the long leaf pine, desirably in suitable form such as chips, resinous material not extracted from such wood by the use of gasoline or other light petroleum hydrocarbons. Solvents of the coal tar hydrocarbon type will, therefore, extract from pine wood a larger quantity of resinous material.

The resinous material extracted, for example, with coal tar hydrocarbons after the coal tar hydrocarbons and volatile terpene oils have been removed by suitable means, is a mixture consisting principally of FF rosin and a resinous substance other than rosin. It has been the practice heretofore to separate this mixture by means of a pair of selective solvents such as, for example, gasoline and furfural, although many other pairs of solvents are also known which will effect this separation. When the gasoline-furfural combination is used, rosin dissolves in the gasoline and the resinous substance other than rosin, dissolves in the furfural and evaporation of the furfural leaves this resinous substance as a solid mass. For a great many purposes, however, it is essential that this resin be in a powdered form. In prior art methods, it has been necessary to chill the solid resin, obtained in the manner shown before, and then pulverize said resin in order to obtain it in a pulverulent form required for many uses.

It is an object of this invention to provide a pulverulent, free-flowing resin substantially insoluble in light petroleum hydrocarbons, which is derived from pine wood.

It is also an object of this invention to provide a method whereby resin obtained from the extraction of pine wood with a suitable solvent and characterized by substantial insolubility in light petroleum hydrocarbons, may be produced directly in a pulverulent, free-flowing form.

Further objects will appear hereinafter.

I have found that a pulverulent, free-flowing resin substantially insoluble in light petroleum hydrocarbons, may be produced by treating pine wood with a solvent which is capable of dissolving the normally solid resinous materials and terpene oils present in said pine wood, removing the solution so obtained from the pine wood, evaporating the said solvent and other volatile portions from the solution, extracting the residue remaining with a substantially saturated liquid paraffin hydrocarbon in the liquid state, at a temperature below that at which the particles of the residue soften, thereby dissolving the rosin and leaving an insoluble residue in finely divided form, recovering this insoluble residue and drying it to obtain a pulverulent, free-flowing resin having the aforesaid characteristic.

In proceeding in accordance with my invention, pine wood, preferably that from the Southern long leaf pine in suitable form such as, for example, chips, may be extracted with a solvent for the FF rosin, turpentine and pine oil contained in the chips and which is likewise a solvent for the other complex substances contained in the wood chips; such a solvent may be, for example, a coal tar hydrocarbon such as, benzene, toluene, xylene, etc., and the extraction may be accomplished by flooding pine chips with the solvent with or without the use of heat. After the extraction of the chips has been sufficient, the coal tar hydrocarbon solution of the matter extracted may be withdrawn from the wood chips.

To recover a pulverulent, free-flowing resin substantially insoluble in light petroleum hydrocarbons from the matter extracted from the pine chips, I may proceed in the following manner:

The crude solution obtained in extracting pine wood is evaporated and the solvent used for the original extraction, together with the volatile terpene oils, for example, turpentine and pine oil, are recovered, leaving a dark colored residue comprising a mixture of FF wood rosin and a resinous material, the recovery of which is the object of my invention. I then extract this dark colored residue with a substantially saturated liquid paraffin hydrocarbon in the liquid state. The temperature used for this extraction may vary, but the maximum temperature usable in accordance with the method of the present invention will be that temperature at which the precipitated particles soften enough to adhere to each other. This softening point will be affected by the properties of the surrounding liquid medium used since the different hydrocarbon solvents have varying solubilities in the insoluble resinous phase. In order to obtain the residue in a powdery form, it is necessary to stay below this maximum temperature. In general, I have found that a temperature not in excess of about 35° C. is preferable; although it will be understood that I may use temperatures somewhat higher than this as long as I do not exceed the point where softening of the insoluble particles occurs.

The amount of said hydrocarbon used is not critical, although sufficient should be used to dissolve practically all of the rosin. The amount used will, of course, also be chosen so that the solution produced is relatively fluid, otherwise it will be too difficult to handle. The duration of the extraction will also be variable and will depend upon the particular hydrocarbon used as well as the temperature at which the extraction is carried out.

Extraction of the resinous residue in the manner indicated leaves an insoluble portion in the form of a very finely divided, powdery residue which may be rapidly filtered from the solution, leaving a sparkling clear filtrate. The aforesaid powdery residue may be further washed with fresh paraffin hydrocarbon in order to extract all the soluble matter, and then may be dried at room or slightly elevated temperatures. Drying of the precipitated material may be carried out in any number of devices such as, for example, a rotary kiln drier, a tunnel drier, or a vacuum drier, and the resulting resin, substantially insoluble in light petroleum hydrocarbons, will be in a pulverulent, free-flowing condition.

It will be also understood that instead of carrying out my process as a batch process, it may be carried out on a continuous scale. For example, when using butane as the paraffin hydrocarbon, the crude resinous residue recovered from the solvent extract of pine chips, as above indicated, may be molten and then sprayed into a bath of liquid butane, boiling freely at atmospheric pressure. The resin droplets, upon contact with the butane, are chilled to a low temperature and rapid extraction is secured because of the small size of the droplets. Fresh butane may be continuously added to the bath and both the solution and powdery residue may be continuously removed. The residue, after drying, will be in a pulverulent, free-flowing form.

It will also be appreciated that other suitable continuous methods may be used without departing from the scope of my invention.

Among the substantially saturated liquid paraffin hydrocarbons, which I may use in accordance with my invention, are butane, propane, pentane, hexane or various mixtures of these substantially free from aromatic compounds as well as low boiling petroleum distillates and petroleum ether. When using hydrocarbons which are normally gaseous, it will be necessary to cool the apparatus in which the present extraction process is carried out in order to have the hydrocarbon present in the liquid state. After the crude material containing both rosin and the other resinous substance has been added thereto, the apparatus may be sealed and the extraction carried out in the manner before shown.

Among the solvents which I may use for the extraction of the pine wood are methyl and ethyl alcohol, acetone, ethyl acetate and coal tar hydrocarbons, such as benzene, toluene and xylene. Of these solvents, I prefer using the coal tar hydrocarbons, especially benzene or toluene.

Having shown the general mode of procedure, I will now proceed to a more detailed description thereof by reference to the following examples:

*Example 1*

A stainless steel autoclave of 1700 cc. capacity, fitted with an anchor type stirrer, was cooled in a dry ice-acetone bath to −10° C. and 800 grams of liquid butane were put in. Eighty grams (80) of a residue remaining from a benzene extract of pine wood after removal of the benzene and volatile terpene oils, were then added to the autoclave which was then sealed. The autoclave was warmed to about 35° C. and the agitator operated within the autoclave from about 30 to about 60 minutes in order to insure solution of the soluble matter. After this, the autoclave was again returned to the cold bath and chilled to −10° C., then opened and the contents discharged onto a filter. The insoluble portion was present as a free-flowing and very finely divided powder and filtration took place rapidly and freely giving a sparkling, clear filtrate. After three charges had been treated in the manner indicated, the insoluble residue obtained from all three charges, was combined and returned to the autoclave and washed twice with 800-gram portions of fresh butane. The second wash contained practically no rosin in solution and indicated completion of the separation. The residue was then dried at room temperature and a pulverulent, free-flowing resin in a yield of 28% was obtained. Fusion of the powder by heating to 170–180° C. gave a product with the following characteristics:

Drop melting point _____° C__ 106.5
Gasoline insoluble _____%__ 81.2

It is also interesting to note that evaporation of the butane from the soluble portion gave a yield of 72% of rosin having a color grading of M.

*Example 2*

One hundred grams (100) of the same crude resinous extract as used in Example 1 and 900 grams of commercial hexane were charged into an autoclave and agitated at room temperature until all of the rosin was in solution. The contents of the autoclave were then discharged through a filter, the insoluble portion being present in a free-flowing and very finely divided form. Filtration took place rapidly and easily and gave a sparkling, clear filtrate. After drying of the residue, the pulverulent, free-flowing resin, substantially insoluble in light petroleum hydrocarbons, was obtained.

*Example 3*

Three hundred grams (300) of the crude resinous extract as in Example 1 and 2700 grams commercial hexane were agitated to solution at room temperature in three separate lots each of which was then chilled to −10° C. for 15 minutes and filtered. The residues from each of the charges were combined and then washed twice with two 900-gram portions of fresh hexane. The insoluble residue was then dried and obtained as a pulverulent, free-flowing resin. The yields obtained of both the soluble and insoluble fractions are shown in the following table:

|  | Color | Weight | Yield |
| --- | --- | --- | --- |
|  |  | *Grams* | *Percent* |
| Hexane soluble (rosin) | 40A+7.5R | 203.3 | 67. |
| Petroleum hydrocarbon insoluble resin |  | 72.1 | 24 |
| Loss |  | 24.6 | 8.2 |

It will be understood that the details and examples given hereinbefore are illustrative only and in no way limiting on my invention as broadly described hereinbefore and in the appended claims.

What I claim and desire to protect by Letters Patent is:

1. A method of directly producing from pine wood a pulverulent, free-flowing resin which is substantially insoluble in light petroleum hydrocarbons which includes extracting pine wood with an organic solvent which dissolves the normally solid resinous materials and terpene oils present in said wood, separating the extract from the wood, evaporating from said extract said solvent and other volatile portions to produce a solid residue, treating said residue with a substantially saturated low-boiling paraffin hydrocarbon in liquid state at a temperature below that at which the insoluble particles of the residue soften to dissolve substantially all the rosin and leaving an insoluble residue in a finely divided form and recovering said insoluble residue, which, after drying, is in a pulverulent and free-flowing condition, having the aforesaid characteristic.

2. A method of directly producing from pine wood a pulverulent, free-flowing resin which is substantially insoluble in light petroleum hydrocarbons which includes extracting pine wood with a coal tar hydrocarbon which dissolves the normally solid resinous materials and terpene oils present in said wood, separating the coal tar hydrocarbon extract from the wood, evaporating from said extract said coal tar hydrocarbon and other volatile portions to produce a solid residue, treating said residue with a substantially saturated low-boiling paraffin hydrocarbon in liquid state at a temperature below that at which the insoluble particles of the residue soften to dissolve substantially all the rosin and leaving an insoluble residue in a finely divided form and recovering said insoluble residue, which, after drying, is in a pulverulent and free-flowing condition, having the aforesaid characteristic.

3. A method of directly producing from pine wood a pulverulent, free-flowing resin which is substantially insoluble in light petroleum hydrocarbons which includes extracting pine wood with a coal tar hydrocarbon which dissolves the normally solid resinous materials and terpene oils present in said wood, separating the coal tar hydrocarbon extract from the wood, evaporating from said extract said coal tar hydrocarbon and other volatile portions to produce a solid residue, treating said residue with butane in liquid state at a temperature below that at which the insoluble particles of the residue soften to dissolve substantially all the rosin and leaving an insoluble residue in a finely divided form and recovering said insoluble residue, which, after drying, is in a pulverulent and free-flowing condition, having the aforesaid characteristic.

4. A method of directly producing from pine wood a pulverulent, free-flowing resin which is substantially insoluble in light petroleum hydrocarbons which includes extracting pine wood with benzene which dissolves the normally solid resinous materials and terpene oils present in said wood, separating the benzene extract from the wood, evaporating from said benzene extract the benzene and other volatile portions to produce a solid residue, treating said residue with butane in liquid state at a temperature below that at which the insoluble particles of the residue soften to dissolve substantially all the rosin and leaving an insoluble residue in a finely divided form and recovering said insoluble residue, which, after drying, is in a pulverulent and free-flowing condition, having the aforesaid characteristic.

5. A method of directly producing from pine wood a pulverulent, free-flowing resin which is substantially insoluble in light petroleum hydrocarbons which includes extracting pine wood with toluene which dissolves the normally solid resinous materials and terpene oils present in said wood, separating the toluene extract from the wood, evaporating from said toluene extract the toluene and other volatile portions to produce a solid residue, treating said residue with butane in liquid state at a temperature below that at which the insoluble particles of the residue soften to dissolve substantially all the rosin and leaving an insoluble residue in a finely divided form and recovering said insoluble residue, which, after drying, is in a pulverulent and free-flowing condition, having the aforesaid characteristic.

6. A method of directly producing from pine wood a pulverulent, free-flowing resin which is substantially insoluble in light petroleum hydrocarbons which includes extracting pine wood with benzene which dissolves the normally solid resinous materials and terpene oils present in said wood, separating the benzene extract from the wood, evaporating from said benzene extract the benzene and other volatile portions to produce a solid residue, treating said residue with a substantially saturated low-boiling paraffin hydrocarbon in liquid state at a temperature below that at which the insoluble particles of the residue soften to dissolve substantially all the rosin and leaving an insoluble residue in a finely divided form and recovering said insoluble residue, which after drying is in a pulverulent and free-flowing condition, having the aforesaid characteristic.

7. A method of directly producing from pine wood a pulverulent, free-flowing resin which is substantially insoluble in light petroleum hydrocarbons which includes extracting pine wood with toluene which dissolves the normally solid resinous materials and terpene oils present in said wood, separating the toluene extract from the wood, evaporating from said toluene extract the toluene and other volatile portions to produce a solid residue, treating said residue with a substantially saturated low-boiling paraffin hydrocarbon in liquid state at a temperature below that at which the insoluble particles of the residue soften to dissolve substantially all the rosin and leaving an insoluble residue in a finely divided form and recovering said insoluble residue, which after drying is in a pulverulent and free-flowing condition, having the aforesaid characteristic.

8. A continuous method of directly producing from pine wood a pulverulent, free-flowing resin which is substantially insoluble in light petroleum hydrocarbons which includes extracting pine wood with an organic solvent which dissolves the normally solid resinous materials and terpene oils present in said wood, separating the extract from the wood, evaporating from said extract said solvent and other volatile portions and spraying the molten residue into a substantially saturated low-boiling paraffin hydrocarbon in liquid state at a temperature below that at which the insoluble particles of the residue soften to dissolve substantially all the rosin in the low-boiling paraffin hydrocarbon, continuously removing both the residue and paraffin hydrocarbon solution containing the dissolved rosin, continuously replacing the paraffin hydrocarbon removed by fresh paraffin hydrocarbon and recovering the insoluble residue which, after drying, is in a pulverulent and free-flowing condition, having the aforesaid characteristic.

ROBERT W. MARTIN.